(12) United States Patent
Chu

(10) Patent No.: US 6,700,264 B2
(45) Date of Patent: Mar. 2, 2004

(54) PUMP DRIVING SYSTEM OF INDUCTION TYPE

(76) Inventor: Hsu Min Chu, No. 26, Lane 48 White-Der Street, Pei-Tou District, Taipei (TW)

(*) Notice: Subject to any disclaimer, the term of this patent is extended or adjusted under 35 U.S.C. 154(b) by 132 days.

(21) Appl. No.: 09/947,350

(22) Filed: Sep. 7, 2001

(65) Prior Publication Data

US 2003/0080646 A1 May 1, 2003

(51) Int. Cl.[7] ............................................. H02K 49/00
(52) U.S. Cl. ....................... 310/104; 310/105; 310/104
(58) Field of Search .................................. 310/104, 105

(56) References Cited

U.S. PATENT DOCUMENTS

| | | | | |
|---|---|---|---|---|
| 3,742,270 A | * | 6/1973 | Jaeschke | 310/105 |
| 3,828,938 A | * | 8/1974 | Filer | 310/104 |
| 5,763,973 A | * | 6/1998 | Cramer | 310/105 |
| 6,417,591 B1 | * | 7/2002 | Saito | 310/104 |
| 6,468,163 B1 | * | 10/2002 | Boffeli | 464/29 |

* cited by examiner

Primary Examiner—Nicholas Ponomarenko
Assistant Examiner—Iraj A. Mohandesi
(74) Attorney, Agent, or Firm—Birch, Stewart, Kolasch & Birch, LLP

(57) ABSTRACT

An induction pump driving system has a motor shaft, a pump shaft, a first magnetization body, a second magnetization body, an electrical coil, a yoke, and a nonmagnetically electrical-conducting body. The first magnetization body is mounted on the motor shaft and is driven by the motor shaft. The second magnetization body is provided inside a seal cover that is provided at one end of the pump shaft. The first magnetization body, the second magnetization body, the electrical coil, and the yoke are configured to constitute a closed magnetic path. The rotation of the motor shaft is configured to change the magnetic flux of the closed magnetic path to have the nonmagnetically electrical-conducting body, which is coupled with mechanical means, induced with an eddy current and thus, exert an electromagnetic force on the body so as to rotate the pump shaft.

14 Claims, 4 Drawing Sheets

PUMP DRIVING SYSTEM OF INDUCTION TYPE

FIELD OF THE INVENTION

The present invention relates to a pump driving system of induction type and, more particularly, to a driving system of induction type for use in a high pressure pump, whereby the pump shaft is rotated in a non-shaft contacting manner so that the pump will be satisfactorily sealed.

BACKGROUND OF THE INVENTION

The existing pump equipments being used in the industrial process are often driven by a motor shaft to maintain a predetermined pressure therein. Such method has to guarantee a gas-tight seal for the motor shaft to prevent the high pressure gas or particles contained therein from lease of the pump. However, it is quite difficult to have the equipment satisfactorily sealed using such a method. As known, to maintain a normal operation of the motor shaft, it is required to have the pump fitted with a bearing seal to allow the pump shaft to be freely rotated under high speed for maintaining a high pressure gas therein. The motor shaft has to penetrate through the bearing seal or wall so as to drive the pump shaft. It is obviously that the high pressure gas or particles contained therein due to the high pressure thereof is liable to leak through the clearance of the bearing seal, so that it is difficult to maintain a high pressure of the gas and, more worse, the gas or particles contained therein is liable to spread to the interior of the motor, thereby damaging or failing the motor.

In view of the foregoing, the present applicant has contrived a pump driving system of induction type in which the pump shaft is rotated in a non-shaft contacting manner to guarantee a satisfactory seal.

BRIEF SUMMARY OF THE INVENTION

The primary object of the present invention is to provide a pump driving system of induction type that drives a pump shaft by way of electromagnetic interaction, so that the motor shaft is not required to penetrate through the pump housing so that the pump can be kept in a gas-tight se to avoid the possible leakage of the high pressure fluid or particles contained therein, so that the fluid pressure of the pump can be satisfactorily maintained and the breakdown of the motor due to the leakage can be prevented.

In accordance with one aspect of the present invention, the pump driving system of induction type comprises:
 a first shift rotatably mounted on a support housing;
 a second shaft rotatably mounted on a pump housing and having one end at which a seal cover is provided, the seal cover having a circular plate portion being made of electrical-insulated material;
 a first magnetization body mounted on the first shaft and being integrally rotated with the first shaft;
 a yoke mounted on the support housing;
 an electrical coil mounted on the yoke and being positioned adjacent and corresponding to the first magnetization body for generating magnetic flux;
 a second magnetization body being provided inside the seal cover, the second magnetization body being positioned adjacent and corresponding to the first magnetization body, so that the first magnetization body, the second magnetization body, the yoke, and the electrical coil are configured to constitute a closed magnetic path along which the magnetic flux generated from the electrical coil will travel; and
 a nonmagnetically electrical-conducting body being provided inside the seal cover and being positioned between the first magnetization body and the second magnetization body, the nonmagnetically electrical-conducting body being mounted on the second shaft and being integrally rotated with the second shaft; whereby, when the first shaft is rotated, the first magnetization body is allowed to move relative to the yoke and the electrical coil to change the magnetic flux of the closed magnetic path to have the nonmagnetically electrical-conducting body induced eddy current so that the second shaft is capable of being rotated by way of the electromagnetic interaction involved between the eddy current and the magnetic field of the closed magnetic path.

In accordance with another aspect of the present invention, a pump driving system of induction type comprising:
 a first shaft rotatably mounted on a support housing;
 a second shaft rotatably mounted on a pump housing and having one end at which a seal cover is provided, the seal cover having a circular plate portion being made of electrical-insulated material;
 a first magnetization body mounted on the first shaft and being integrally rotated with the first shaft;
 a yoke provided inside the seal cover and mounted on the pump housing;
 an electrical coil mounted on the yoke for generating magnetic flux, the yoke and the electrical coil being positioned adjacent and corresponding to the first magnetization body;
 a second magnetization body being provided inside the seal cover and being integrally rotated with the second shaft, so that the first magnetization body, the magnetization body, the yoke, and the electrical coil are configured to constitute a closed magnetic path along which the magnetic flux generated from the electrical will travel; and
 a nonmagnetically electrical-conducting body being positioned between the first magnetization body and the second magnetization body, the nonmagnetically electrical-conducting body being attached to an inner surface of the first magnetization body and being integrally rotated with the first shaft; whereby, when the first shaft is rotated, the first magnetization body is allowed to move relative to the yoke and electrical coil to change the magnetic flux of the closed magnetic path to have the nonmagnetically electrical-conducting body induced eddy current, so that the second shaft is capable of being rotated by way of the electromagnetic interaction involved between the eddy current and the magnetic field of the closed magnetic path.

Other characteristics and advantages of the present invention will be filly illustrated in the following detailed description with reference to the appended drawings. However, the drawings are illustrative only and do not limit the scope of the present invention.

DETAIL DESCRIPTION OF THE PREFERRED EMBODIMENT

According to Lenz's law of the Physics, when a magnetic flux passing through the area enclosed by an electrical circuit is changed, an electromotive force and current will be induced in the circuit. Similarly, when a magnetic flux passing through a nonmagnetic metal block or plate is changed, eddy current will be induced in the block or plate. As a result, the changing magnetic flux passing through the block or plate will interacted with the induced eddy current to thereby exert an electromagnetic force on the block or block so as to oppose the change of the magnetic flux.

The present invention has applied the principles of the electromagnetic induction to contrive a driving device that employs a nonmagnetic metal block or disk being passed through a changing magnetic flux and being coupled to mechanical means or shaft, so that the electromagnetic force resulting from the interaction of the changing magnetic flux and the eddy current can cause a desired shaft to rotate. The two embodiments of the present invention will be fully illustrated below.

Figure 1:
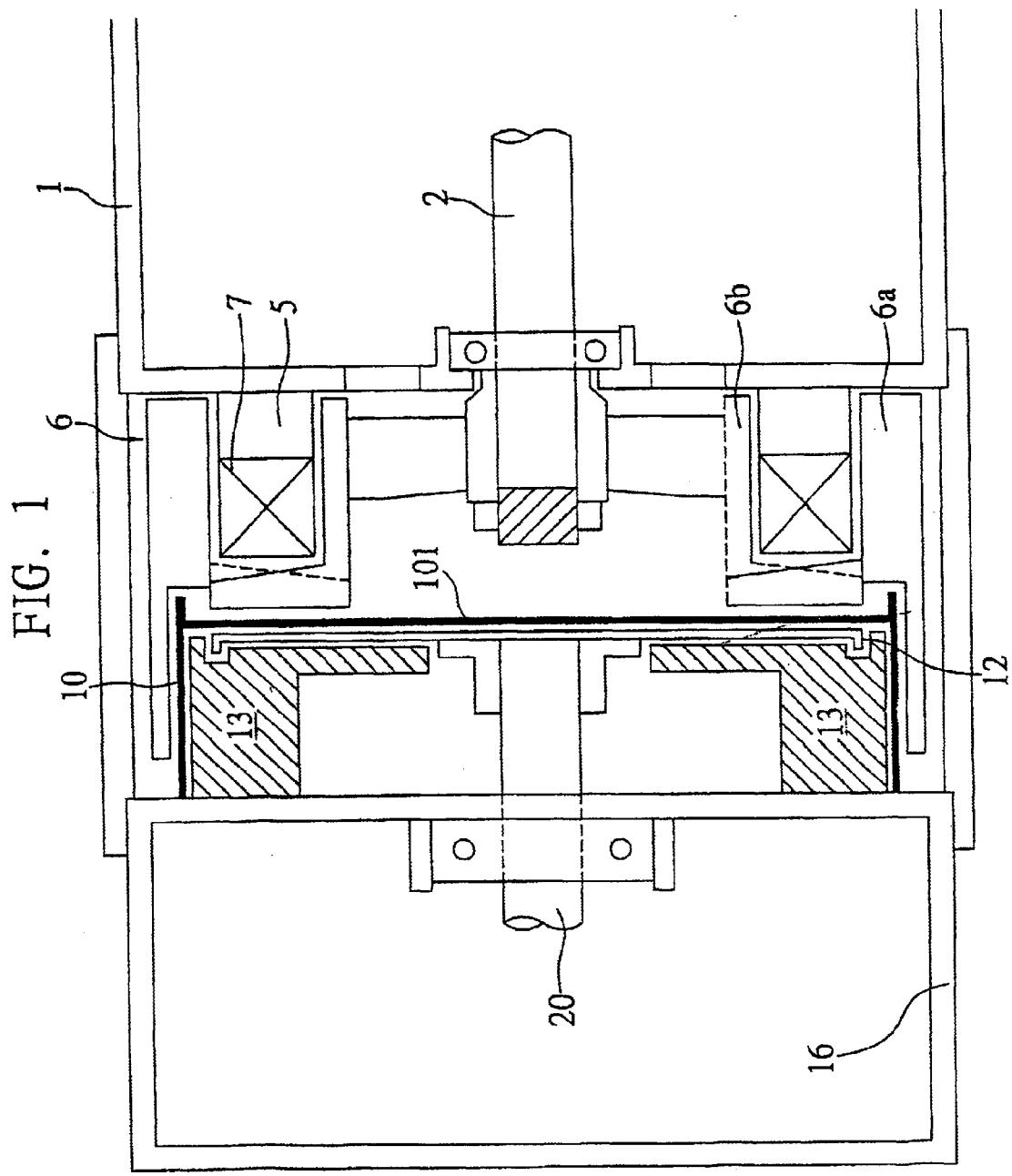
FIG. 1 is a schematically sectional view of the first embodiment of the present invention.
Figure 2:
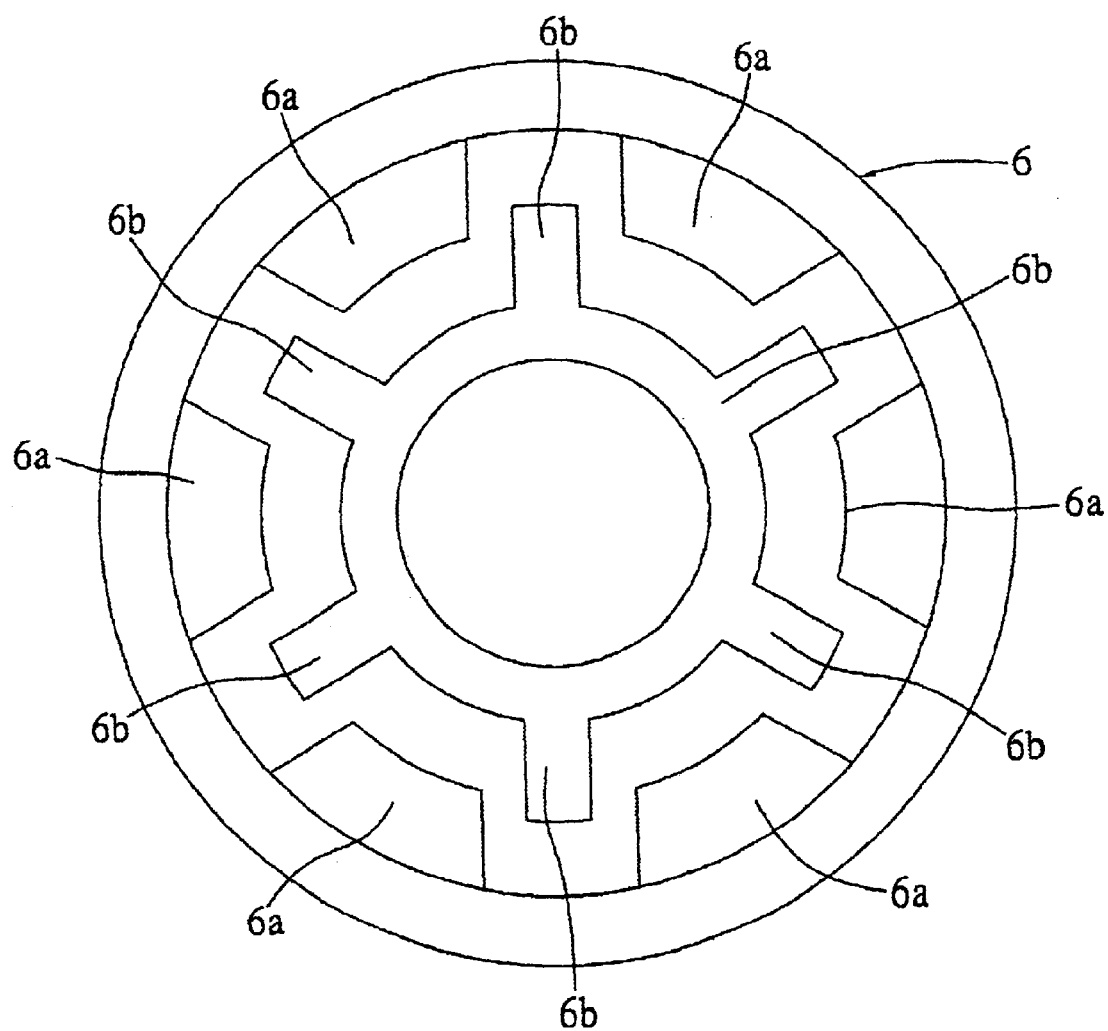
FIG. 2 is a schematically front view of the first magnetization body of FIG. 1.

Referring to FIG. 1, the first embodiment of the present invention includes a first shaft 2, a second shaft 20, a first magnetization body 6 being preferably made of ferromagnetic material, a second magnetization body 13 being preferably made of ferromagnetic material, an electrical coil 7, a yoke 5, and a nonmagnetically electrical-conducting body 12. The first shaft 2, being an input shaft driven by a powered equipment (such as a motor) is mounted on a support housing 1 (such as a motor housing). The second shaft 20, being a driving shaft of a high pressure pump for maintaining the pump at a predetermined pressure, is mounted on a pump housing 16. A seal cover 10 having a circular plate portion 101 is provided at one end of the second shaft 20 for preventing the high pressure fluid or particles contained therein from leakage of the pump. Also, the circular plate portion 101 is disposed between the first shaft 2 and the second shaft 20. As shown in FIG. 2, the first magnetization body 6 can be designed as a flywheel structure for smoothing the driving power of the first shaft 2. The flywheel structure is designed to have an outer ring 6a and an inner ring 6b, between which a ring-shaped groove is defined. The outer ring 6a and the inner ring 6b are respectively distributed with opposing magnetic poles (N pole or S pole), being induced from the electrical coil 7 and the yoke 5, along the circumferences thereof. Referring back to FIG. 1, the second magnetization body 13 can be shaped as an annular body that is provided inside the seal cover 10 and is located adjacent and corresponding to the first magnetization body 6. The yoke 5 is mounted on the supporting housing that supports the first shaft 2. The electrical coil 7 is mounted on the yoke 5 for generating magnetic flux. The yoke 5 and the electrical coil 7 are received in the ring-shaped groove defined by the outer ring 6a and the inner ring 6b. It is understood that the circular plate portion 101 of the seal cover 10 is preferably made of an electrical-insulated material to avoid generating unwanted eddy current on the portion, as the eddy current generation of the portion will effect the eddy current induction of the nonmagnetically electrical-conducting body 13. According to the arrangement as shown, the first magnetization body 6, the second magnetization body 13, the electrical coil 7, and the yoke 5 are configured to constitute a closed magnetic path along which the magnetic flux generated from the electrical coil will travel. The nonmagnetically electrical-conducting body can be designed as a disk being mounted on the second shaft 20 for being integrally rotated with the second shaft 20. The nonmagnetically electrical-conducting body is provided inside the seal cover 10 and positioned between the first magnetization body 6 and the second magnetization body 13. The nonmagnetically electrical-conducting body can be made of copper or aluminum. According to the arrangement as shown, the nonmagnetically electrical-conducting body 12 is so positioned to allow the magnetic flux generated from the electrical coil 7 to pass through it. Therefore, when the magnetic flux of the closed magnetic path is changed through the rotation of the first magnetization body 6, the nonmagnetically electrical-conducting body 12 will be induced with an eddy current.

Referring to FIG. 1, when the electrical coil 7 is energized and the first shaft 2 is rotated, the first magnetization body 6 can be rotated to move relative to the electrical coil 7 and the yoke 5 so that the magnitude of the magnetic flux can be changed to have the nonmagnetically electrical-conducting body 12 induced with an eddy current. Therefore, an electromagnetic force will effect on the nonmagnetically electrical-conducting body 12 by way of the electromagnetic interaction involved between the magnetic field of the magnetic flux and the eddy current, and this will cause the second shaft 20 to rotate.

Further, in order to adjust the pressure of the high compressed fluid in the pump housing 16, the rotating speed of the shaft 20 shaft be controllable. Thus, the present invention is preferably provided with current or voltage means for adjusting the magnetic flux so as to control the shaft speed.

Figure 3:
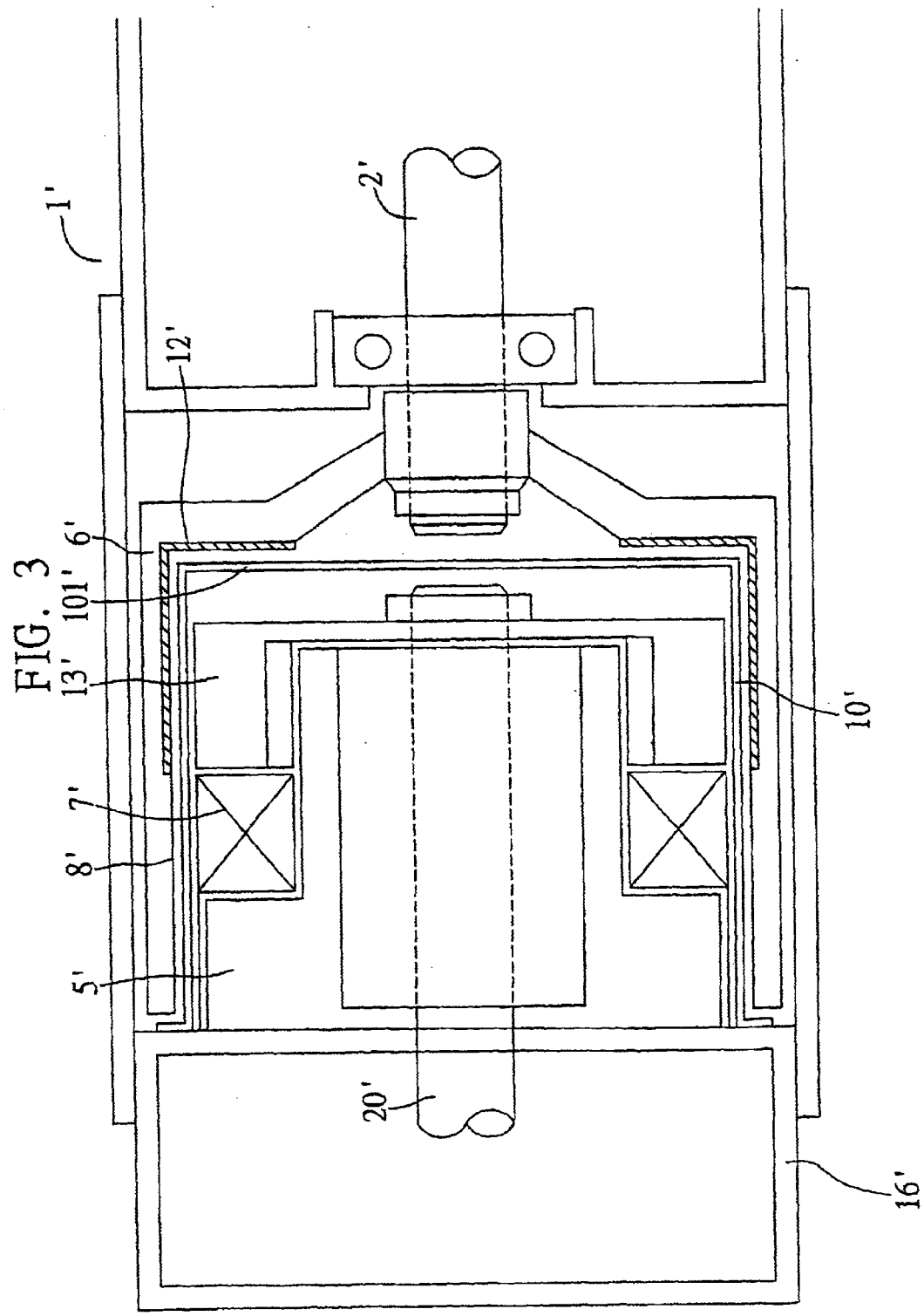
FIG. 3 is a schematically sectional view of the second embodiment of the present invention.
Figure 4:
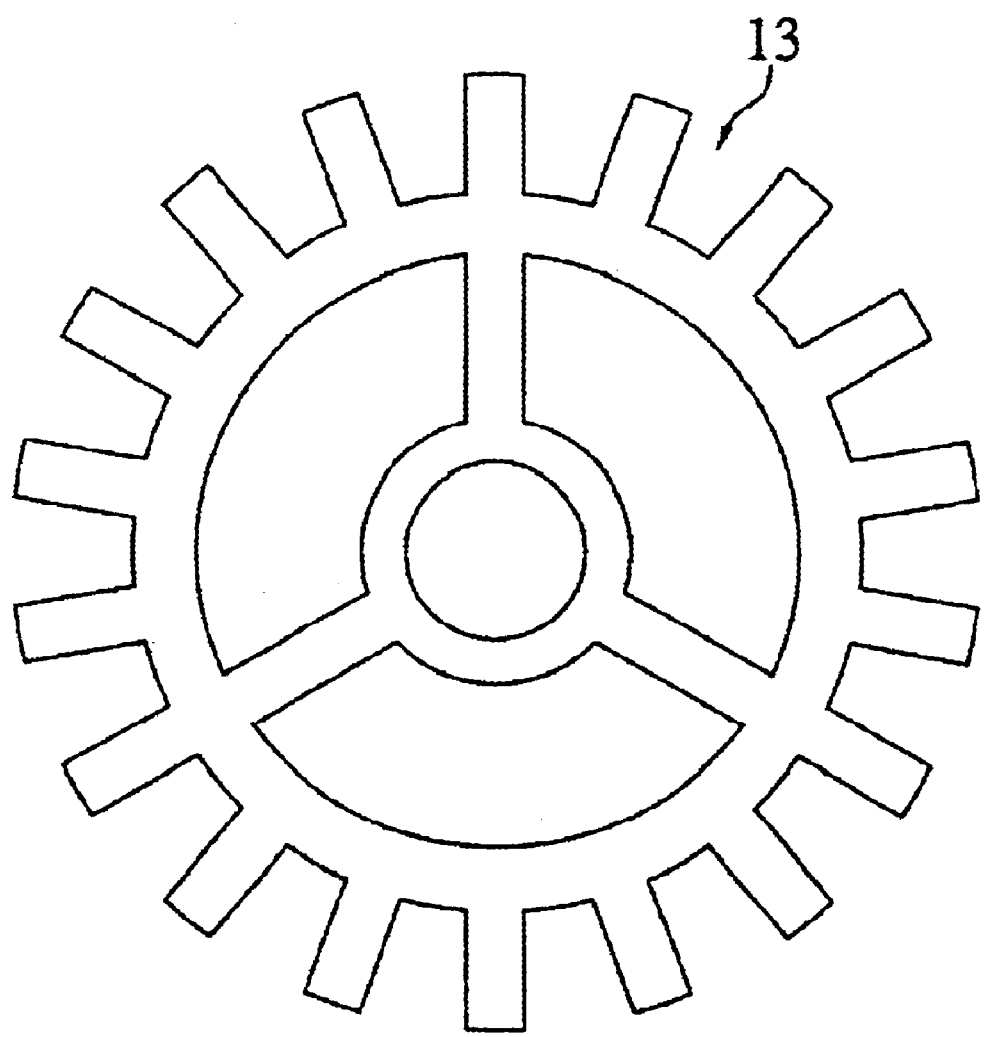
FIG. 4 is a schematically front view of the second magnetization body of FIG. 3.

Referring to FIG. 3, the second embodiment of the present invention includes a first shaft 2', a second shaft 20', a first magnetization body 6' being preferably made of ferromagnetic material, a second magnetization body 13' being preferably made of ferromagnetic material, an electrical coil 7', a yoke 5', and a nonmagnetically electrical-conducting body 12'. The first shaft 2', being an input shaft driven by a powered equipment such as a motor, is rotatably mounted on a support housing 1' such as a motor housing. The second shaft 20', being a driving shaft of a high pressure pump, is mounted on a pump housing 16' for maintaining the pump at a predetermined pressure. As shown, a seal cover 10' having a circular plate portion 101' is provided at one end of the second shaft 20' for preventing the high pressure fluids or particles contained therein from leakage of the pump. Also, the circular plate portion 101' is disposed between the first shaft 2' and the second shaft 20'. The first magnetization body 6' is mounted on the first shaft 2' and integrally rotated with the first shaft 2'. As shown, the first magnetization body 6' can be designed as a cylindrical flywheel structure for smoothing the rotation of the first shaft 2'. As shown in FIG. 4, the second magnetization body 13', being formed as a toothed ring, is provided inside the seal cover 10' and is positioned adjacent and corresponding to the first magnetization body 6'. Referring back to FIG. 3, the yoke 5', being formed as a ring-shaped structure, is provided inside the seal cover 10' and mounted on the pump housing 16'. The electrical coil 7' is mounted on the yoke 5' for generating magnetic flux. The yoke 5' and electrical coil 7' are positioned adjacent and corresponding to the first magnetization body 6'. It is to be understood that the circular plate portion 101' of the seal cover is preferably made of an electrical-insulated material to avoid generating unwanted eddy current on the portion, as the eddy current generation of the portion will effect the induced eddy current of the nonmagnetically electrical-conducting body 12' to thereby reduce the driving torque of the second magnetization body 13'. According to the arranged as shown, the first magnetization body 6', the second magnetization body 13', the electrical coil 7', and the yoke 5' are configured to constitute a closed magnetic path along which the magnetic flux generated from the electrical coil will travel. The nonmagnetically electrical-conducting body 12', being formed as a cylindrical shell, is attached to an inner surface of the cylindrical magnetization body 6' and is capable of being rotated together with the cylindrical magnetization body 6'. As shown, the nonmagnetically electrical-conducting body 12' is positioned between the first magnetization body 6' and the second magnetization body 13'. The nonmagnetically electrical-conducting body 12' can be made of copper or aluminum. According to the arrangement as shown, the closed magnetic path for the magnetic flux generated from the electrical coil is going to pass through the nonmagnetically electrical-conducting body 12' so that, when the magnetic flux of the path is changed through the rotation of the first shaft 2', the nonmagnetically electrical-conducting body 12' can be induced eddy current.

Referring to FIG. 3, when the electrical coil 7' is energized and the first shaft 2' is rotated, the first magnetization body 6' can be rotated to move relative to the electrical coil 7' and the yoke 5' so that the magnitude of the magnetic flux can be changed to have the nonmagnetically electrical-conducting body 12' induced with an eddy current. Therefore, an electromagnetic force will effect on the nonmagnetically electrical-conducting body 12' by way of the electromagnetic interaction involved between the magnetic field of the magnetic flux and the eddy current, and this will cause the second shaft 20' to rotate.

Further, in order to adjust the pressure of the high compressed fluid in the pump housing 16', the rotating speed of the shaft 20' shall be controllable. Thus, the present invention is preferably provided with current or voltage adjustment means for adjusting the magnetic flux so as to control the shaft speed.

More further, in order to enhance the magnetization effect of the closed magnetic path, the cylindrical flywheel structure mentioned above can be provided with a ring-shaped iron ring 8' being attached to an inner surface of the flywheel structure corresponding to the electrical coil 7' and the yoke 5'.

As a summary, the present invention has applied the electromagnetic induction principles to contrive a driving device for a high pressure pump in a non-shaft contacting manner so that a motor shaft is not required to penetrate through the pump housing so that the high pressure fluid or particles contained therein can be prevented from leakage of the pump so as to assure the specified life span of the motor.

Although the present invention has been described with a certain degree of particularity, it is understood that the present disclosure is made by way of example only and the combination and arrangement of parts may be resorted to without departing from the spirit and scope of the invention hereinafter claimed.

What is claimed is:

1. A pump driving system of induction type, comprising:
    a first shaft rotatably mounted on a support housing;
    a second shaft rotatably mounted on a pump housing;
    a first magnetization body mounted on said first shaft and being integrally rotated with said first shaft;
    a nonmagnetically electrical-conducting body mounted on either said first [shaft] magnetization body or said second shaft;
    a seal cover provided at one end of said second shaft and having a circular plate portion that is made of electrical-insulated material; and
    means for providing and changing magnetic flux to pass through sad first magnetization body, said means being actuated by said first shaft to change the magnetic flux passing through said first magnetization body to have said nonmagnetically electrical-conducting body induced with an eddy current so as to rotate said second shaft by way of electromagnetic interaction of the eddy current and the magnetic field of the magnetic flux.

2. The pump driving system of induction type recited is claim 1, wherein said nonmagnetically electrical-conducting body is mounted on said second shaft and integrally rotated with said second shaft, so that the changing magnetic flux is capable of creating an electromagnetic force on said nonmagnetically electrical-conducting body so as to rotate said second shaft.

3. The pump driving system of induction type as recited in claim 2, wherein said means or providing and changing magnetic flux includes an electrical coil and a yoke being mounted on said support housing, wherein said electrical coil is mounted on said yoke for generating the magnetic flux, and said electrical coil and said yoke are positioned adjacent and corresponding to said first magnetization by; whereby, when said first shaft is rotated, said first magnetization body is alloyed to move relative to said electrical coil and said yoke so that the magnetic flux provided from said electrical coil a passing through said first magnetization body is going to be changed.

4. The pump driving system of induction type as recited in claim 3, wherein a second magnetization body is provided inside said seal cover and is positioned adjacent and corresponding to said first magnetization body, so that said first magnetization body, said magnetization body, said electrical coil, and said yoke are configured to constitute a closed magnetic path along which the magnetic flux will travel, and said nonmagnetically electrical-conducting body is positioned between said first magnetization body and second magnetization body, whereby the changing magnetic flux is capable of creating an electromagnetic force on said nonmagnetically electrical-conducting body so as to rotate said second shaft.

5. The pump driving system of induction type as recited in claim 4, wherein said first magnetization body is a flywheel structure.

6. The pump driving system of induction type as recited in claim 1, wherein a second magnetization body is provided inside said seal cover and integrally rotated with said second shaft, said second magnetization body is positioned adjacent and corresponding to said first magnetization body, said nonmagnetically electrical-conducting body is mounted on said first magnetization body and integrally rotated with said first magnetization body, said nonmagnetically electrical-conducting body is positioned between said first magnetization body and second magnetization body, said means for providing and changing magnetic flux including an electrical coil and a yoke is provided inside said seal cover, said electrical coil is mounted on said yoke for generating the magnetic flux, and said electrical coil and said yoke are positioned adjacent and corresponding to said first magnetization body, so that said first magnetization body, said second magnetization body, said electrical coil, and said yoke are configured to constitute a closed magnetic path along which the magnetic flux will travel, whereby the changing magnetic flux is capable of creating an electromagnetic force on said nonmagnetically electrical-conducting body so as to rotate said second shaft.

7. The pump driving system of induction type as recited in claim 6, wherein said first magnetization body is a flywheel structure.

8. A pump driving system of induction type, comprising:
 a first shaft rotatably mounted on a support housing;
 a second shaft rotatably mounted on a pump housing and having one end at which a seal cover is provided, said seal cover having a circular plate portion being made of electrical-insulated material;
 a first magnetization body mounted on said first shaft and being integrally rotated with said first shaft;
 a yoke mounted on said support housing;
 an electrical coil mounted on said yoke for generating magnetic flux, said electrical coil being positioned adjacent and corresponding to said first magnetization body;
 a second magnetization body being provided inside said seal cover, said second magnetization body being positioned adjacent and corresponding to said first magnetization body, so that said first magnetization body, said second magnetization body, said yoke, and said electrical coil are configured to constitute a closed magnetic path along which the magnetic flux generated from said electrical coil will travel; and
 a nonmagnetically electrical-conducting body being provided inside said seal cover and being positioned between said first magnetization body and said second magnetization body, said nonmagnetically electrical-conducting body being mounted on said second shaft and being integrally rotated with said second shaft; whereby, when said first shaft is rotated, said first magnetization body is allowed to move relative to said yoke and said electrical coil to change the magnetic flux of said closed magnetic path to have said nonmagnetically electric-conducting body induced with an eddy current so that said second shaft is capable of being rotated by way of the electromagnetic interaction involved between said eddy current and the magnetic field of said closed magnetic path.

9. The pump driving system of induction type as recited in claim 8, wherein said first magnetization body is a flywheel structure.

10. The pump driving system of induction type as reeked in claim 9, wherein said flywheel structure has an outer ring and an inner ring, between which a ring-shaped groove is defined for receiving said yoke and said electrical coil, and along the circumferences of which opposing magnetic poles we respectively distributed.

11. The pump driving system of induction type as recited in claim 10, further comprising an electrical means for adjusting the current flowing through said electrical coil to adjust the magnetic flux so as to control the rowing speed of said second shaft.

12. The pump driving system of induction type as recited in claim 11, wherein said nonmagnetically electrical-conducting body is shaped as a disk.

13. The pump driving system of induction type as recited in claim 12, wherein said disk is made of copper or aluminum.

14. The pump driving system of induction type as racked in claim 13, wherein said second magnetization body is shaped as an annular body.

* * * * *